US006957345B2

(12) United States Patent
Cesana et al.

(10) Patent No.: US 6,957,345 B2
(45) Date of Patent: Oct. 18, 2005

(54) TAMPER RESISTANT CARD ENCLOSURE WITH IMPROVED INTRUSION DETECTION CIRCUIT

(75) Inventors: Mario Leonardo Cesana, Milan (IT); Roberto Antonio Zavatti, Milan (IT)

(73) Assignee: International Business Machines Corporation, Armonk, NY (US)

(*) Notice: Subject to any disclaimer, the term of this patent is extended or adjusted under 35 U.S.C. 154(b) by 866 days.

(21) Appl. No.: 09/850,917

(22) Filed: May 7, 2001

(65) Prior Publication Data

US 2001/0056542 A1 Dec. 27, 2001

(30) Foreign Application Priority Data

May 11, 2000 (GB) .............................................. 0011247

(51) Int. Cl.[7] ......................... G06F 11/30; G06F 12/14; H04L 11/30

(52) U.S. Cl. ....................................... 713/194; 713/193

(58) Field of Search .................................. 713/194, 193

(56) References Cited

U.S. PATENT DOCUMENTS

| | | | | |
|---|---|---|---|---|
| 3,772,674 A | * | 11/1973 | Jackson | 206/459.1 |
| 4,860,351 A | * | 8/1989 | Weingart | 713/194 |
| 5,027,397 A | | 6/1991 | Double et al. | 713/194 |
| 5,060,261 A | * | 10/1991 | Avenier et al. | 713/194 |
| 5,285,734 A | | 2/1994 | MacPherson | 109/42 |
| 5,309,136 A | * | 5/1994 | Rezgui et al. | 338/295 |
| 5,539,379 A | | 7/1996 | MacPherson | 346/550 |
| 5,858,500 A | * | 1/1999 | MacPherson | 428/68 |
| 6,686,539 B2 | * | 2/2004 | Farquhar et al. | 174/52.3 |

FOREIGN PATENT DOCUMENTS

| | | |
|---|---|---|
| EP | 0 514 708 A1 | 11/1992 |
| FR | 2782159 | 11/2000 |
| GB | 2182467 | 5/1987 |
| GB | 2256957 | 12/1992 |
| GB | 2264378 | 8/1993 |

* cited by examiner

*Primary Examiner*—Gilberto Barron, Jr.
*Assistant Examiner*—Venkat Perungavoor
(74) *Attorney, Agent, or Firm*—Scully, Scott, Murphy & Presser; William H. Steinberg, Esq

(57) ABSTRACT

A system for protecting an electronic device from mechanical intrusion attempt. An intrusion barrier able to detect mechanical intrusion by means of circuit traces which detect any change in the resistance characteristics of the electric circuit. These circuit traces function as a resistors and they are connected together to form a Wheatstone bridge. According to the present invention the logical lay-out of these connections is selected so that the voltage difference between two adjacent traces is minimized. In this way the current leakage effect is limited to the minimum.

6 Claims, 3 Drawing Sheets

TAMPER RESISTANT CARD ENCLOSURE WITH IMPROVED INTRUSION DETECTION CIRCUIT

FIELD OF INVENTION

The present invention relates to protection of electronic cards from unauthorised intrusion, more particularly the present invention relates to a security enclosure with an improved intrusion detection circuit.

BACKGROUND OF THE INVENTION

It is a usual requirement for many computer applications to protect data from unwanted access by an unauthorised user. Many software protection systems are known in the art to allow only selected users to access said protected data, with the use of a password or other identification methods. Communication of data on a network is protected from undesired detection by means of encryption methods. Passwords, encryption keys and other sensitive data are usually stored in memory components in the computer systems and need to be protected even more carefully from unwanted inspection. Software control and protection methods may be not enough to stop an experienced person from bypassing these protections and tampering with the computer hardware, e.g. by direct interrogation of memory components such as integrated circuit memory.

A possible protection from the above physical attacks is to provide some kind of detecting means which detects an attempted intrusion within a protected sensitive area and reacts by giving an alarm or even by destroying any sensitive information to avoid the loss of secrecy.

U.S. Pat. No. 5,027,397 describes an intrusion barrier for protecting against mechanical and chemical intrusion into an electronic assembly. The barrier includes a screen material surrounding the electronic assembly. The screen material has formed thereon fine conductive lines in close proximity to each other in a pattern that limits the mechanical access which could be achieved without disturbing the resistive characteristic of at least one line or line segment. The lines are formed of conductive particles of material dispersed in a solidified matrix of material which loses its mechanical integrity when removed from the screen substrate. Electrical supply and signal detection means are provided which are adapted to supply a signal to the conductive lines and generate an output signal responsive to a given change in the resistance of the conductive lines whereby, when the resistance of the conductive lines changes, either as result of chemical or mechanical attack, a signal is generated which causes an alarm and the erasure of sensitive information in the protected memory component.

In order to better protect the content of the security enclosure from the most sophisticated intrusion techniques, the wires should also be invisible and not detectable. For this reason it is known to make these wires with non-metallic, x-ray transparent, (low) conductive materials, merged into a resin having color, physical and mechanical characteristics very similar to the conductive tracks. This requirement constitutes a significant constraint in the choice of the material for the resin which often provides poor electrical insulation. In some circumstances the insulation deteriorates with the increase of the temperature and this makes the detecting circuit unstable and prone to false tamper detection. This problem is due to the current leakage through the resin.

It is an object of the present invention to alleviate the above drawbacks of the prior art.

DISCLOSURE OF THE INVENTION

According to the present invention, we provide a tamper resistant enclosure for protecting an electronic device comprising an intrusion detection barrier with a plurality of circuit traces for detecting mechanical intrusion attempts which cause a change in the resistance of said circuit traces, the circuit traces being connected according to a logical layout, the logical layout of the circuit traces being selected so that, in use, the voltage differences between adjacent circuit traces are minimized.

Also according to the present invention we provide an assembly including an electronic device needing protection from unauthorised intrusion, and a tamper resistant enclosure as described above.

BRIEF DESCRIPTION OF THE DRAWINGS

Various embodiments of the invention will now be described in detail by way of examples, with reference to accompanying figures, where.

DESCRIPTION OF THE PREFERRED EMBODIMENTS

Figure 1:
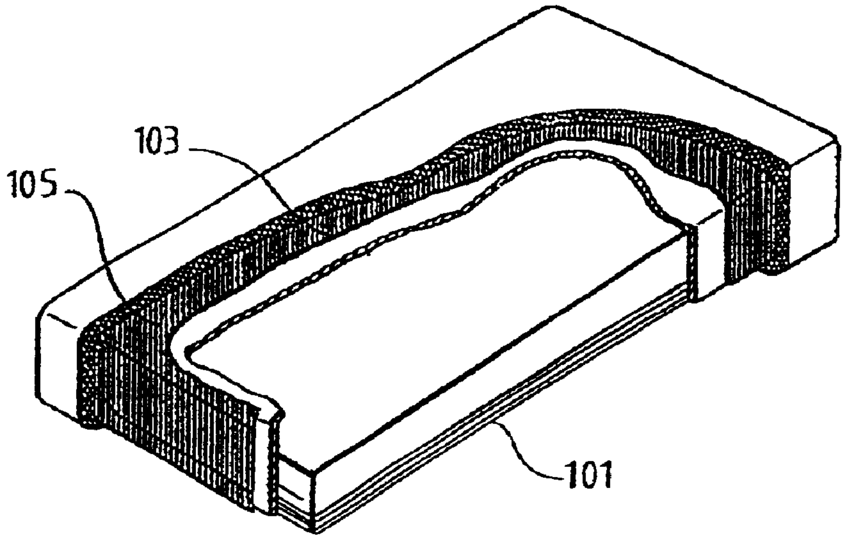
FIG. 1 shows schematically a tamper resistant card enclosure according to a preferred embodiment of the present invention.

With reference to FIG. 1 a tamper proof enclosure according to a preferred embodiment of the present invention is shown. The enclosure is compliant to F.I.P.S. (Federal Information Protection Standard) 140-1 Level 4. An electronic device 101 containing sensitive information (e.g. an electronic cryptographic device), is protected by an intrusion barrier 103. As explained above with reference to prior art (U.S. Pat. No. 5,027,397) the intrusion barrier 103 includes circuit traces 105 which are able to detect mechanical intrusion. When a change in the resistance of the circuit traces is detected, the system assumes that a tampering is being attempted and it reacts by giving an alarm and by erasing all the sensitive information contained in the protected alectronic device 101. According to a preferred embodiment of the present invention, the intrusion barrier 103 is a flexible tape e.g. as the one described in U.S. Pat. No. 5,285,734. This flexible tamper respondent sheet preferably has a delamination respondent layer and a laser and pierce respondent layer which includes tracks of electrically responsive material. The tracks are monitored, so that an attempt to penetrate the layer results in one or more of the tracks being cut to produce a detectable change in a monitored electrical characteristic of the tracks.

According to a preferred embodiment of the present invention each wire has the same resistance value. The wires act as resistors connected together: when one of these wires (circuit traces) is interrupted the resistance value of the circuit changes and a tamper attempt is detected.

Figure 2:
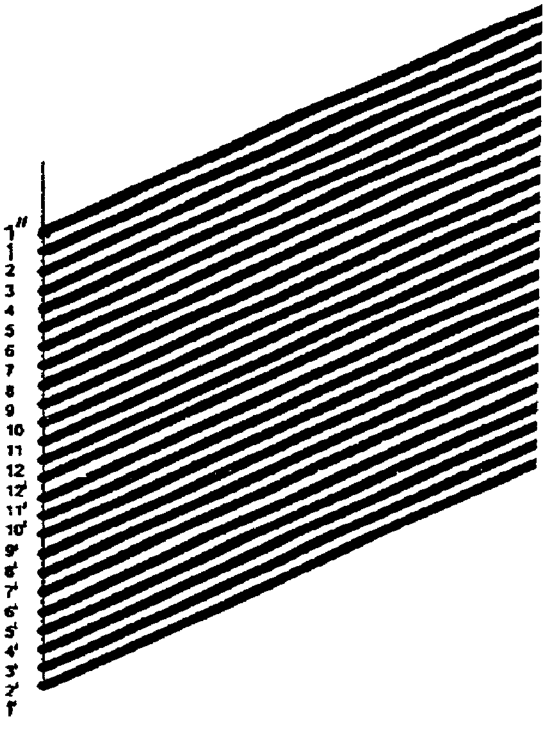
FIGS. 2 and 3 show a physical layout according to a preferred embodiment of the present invention.
Figure 3:
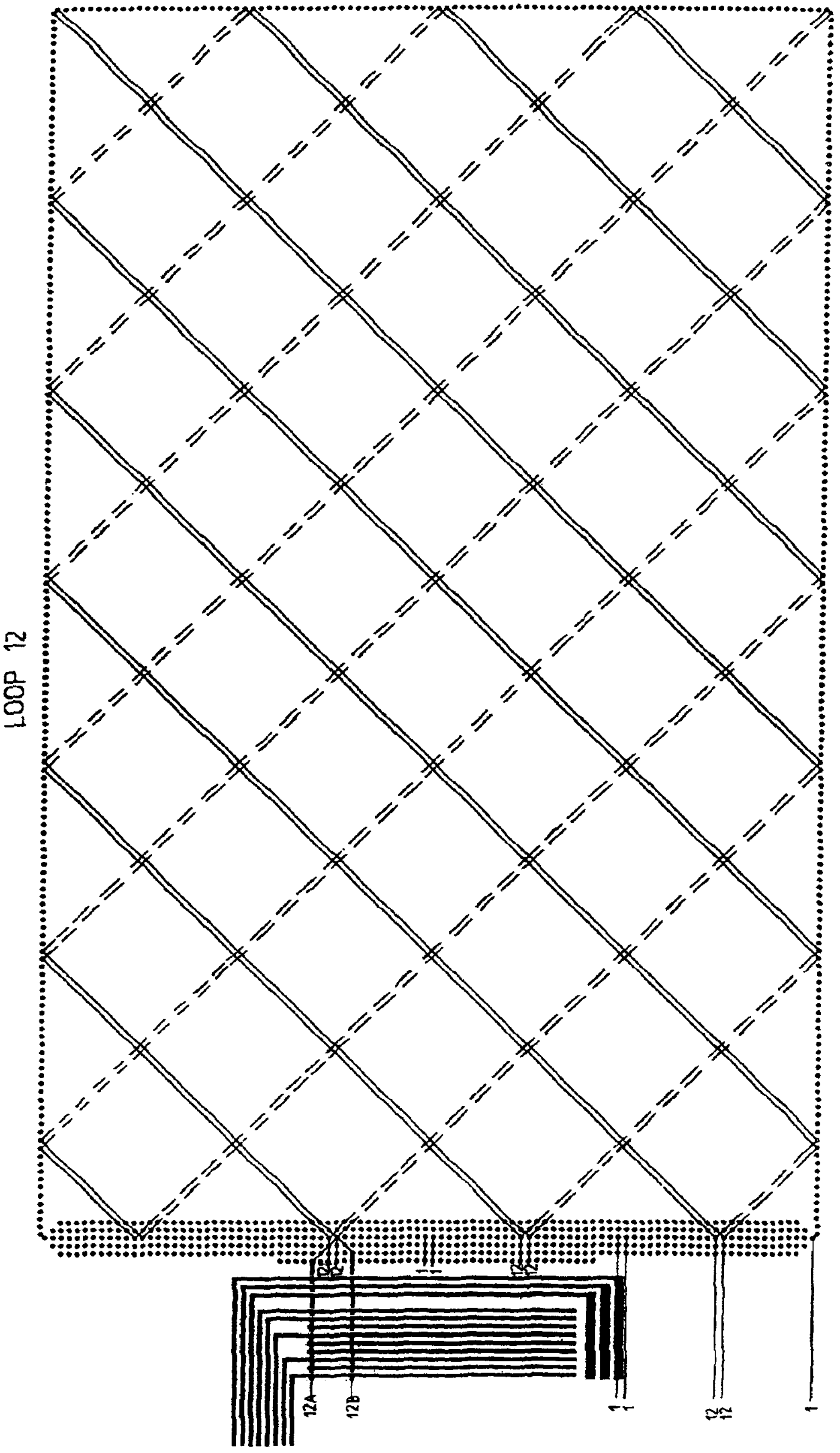
Figure 4:
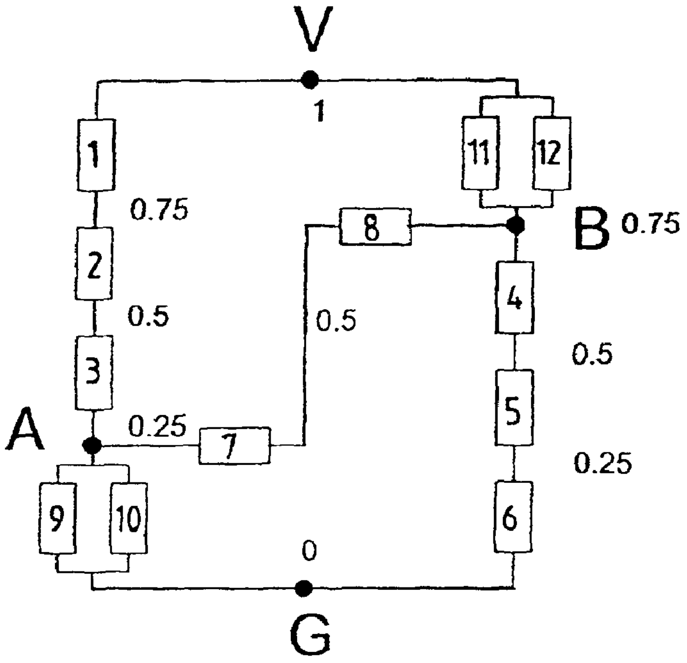
FIG. 4 shows the connection of the circuit traces by means of a Wheatstone bridge according to the prior art.

According to a preferred embodiment of the present invention, the mesh corresponding to the example of FIG. 1 is a continous pattern of e.g. 12 wires running in parallel all around the enclosure. The mesh is layed out on two layers, and only one (top) is in contact with the resin. The layout of the top layer is represented in FIG. 2. The 12 wires have 12 adjacent start points. The 12 wires run in parallel and after a complete loop they restart in a mirrored sequence adjacent to the start points (numbers from 1' to 12'). FIG. 4 shows the complete route of one of the 12 wires (loop 12) of the example above. It starts at point 12*a* and arrives after many crossings at point 12*b*. In FIG. 4 the continuous lines indicate the wires on the top side of the flexible tape; when they arrive on the border they pass on the other side and continue the route; the dotted lines indicate the wires on the bottom side.

The terminals of the wires are then connected together to form a circuit, which is able to detect an intrusion attempt by monitoring the resistance value. The connection is realised by means of a connection matrix as also described in U.S. Pat. Nos. 5,539,379 and 5,285,734. As mentioned above the wires act as resistors in this circuit. It is usual to connect them together to form a Wheatstone bridge as the one represented in FIG. 4. A Wheatstone bridge has a minimum of 4 (or 5 if there is a central one) resistors, but each one may be split in two or more resistors.

Figure 5:
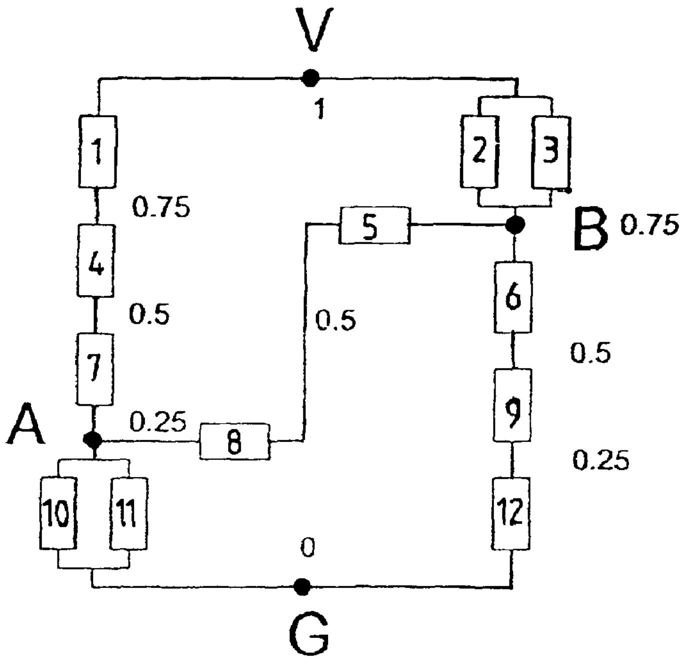
FIG. 5 shows the connection of the traces by means of a Wheatstone bridge according to a preferred embodiment of the prior art.

According to a preferred embodiment of the present invention, a Wheatstone bridge having 12 resistors (wires) has been used to create the circuit traces for intrusion detection barrier as represented in FIG. 5. It is a logical diagram where each wire has the same length and is represented in FIG. 5 by a resistor. A voltage Vb is applied between terminals V and G, while terminals A and B are monitored. Under normal conditions, A will measure 0.75×Vb, B will measure 0.25×Vb. In case one or more wires are interrupted or shorted, the voltage at terminals A and B will trip and the electronic circuit connected to the mesh will detect a tamper.

As mentioned above, the resin is not an ideal insulator; for this reason an electrical path can be established between two adjacent wires. This results into an apparent decrease of resistance of the branches in the circuit and possibly in a measurable voltage trip at terminals A and B. This can cause a false tamper detection.

This phenomenon is called current leakage; it has been discovered that it depends on several factors:

- the distance between tracks;
- the resistivity of the resin;
- the length of wires;
- the voltage difference between two adjacent wires.

The first three parameters are very difficult to modify either for performance reasons (e.g. the distance between tracks should be as short as possible) or for design requirements (e.g. the size of the package).

According to the present invention the current leakage problem is minimized by reducing as much as possible the voltage differences between each couple of adjacent wires. According to a preferred embodiment of the present invention, this is achieved by choosing an appropriate logical layout of the wires (i.e. the connection among the wires), based on the observation that at each terminal of the 12 resistors the voltage applied is the one indicated in FIG. 5.

In fact four groups of 3 resistors (wires) each can be identified where the resistors have the same voltage.

Table 1 shows the solution which minimizes the voltage difference between adjacent wires for the example shown above, assuming the current flows in the same direction on all wires.

TABLE 1

| Voltage differance (*Vb) | between wire | and wire |
|---|---|---|
| <0.25 | 1" | 1 |
| 0 | 1 | 2 |
| 0 | 2 | 3 |
| 0.25 | 3 | 4 |
| 0 | 4 | 5 |
| 0 | 5 | 6 |
| 0.25 | 6 | 7 |
| 0 | 7 | 8 |
| 0 | 8 | 9 |
| 0.25 | 9 | 10 |
| 0 | 10 | 11 |
| 0 | 11 | 12 |
| <0.25 | 12 | 12' |

FIG. 6 shows a possible layout for the example above according to a preferred embodiment of the present invention. With respect to the prior art it can be seen that no adjacent wires differ in voltage by more than Vb/4. Each of the above mentioned group of three resistores (i.e. wires) are made by adjacent wires (e.g. 1, 2 and 3; 4, 5 and 6). Only between 3 and 4, 6 and 7 and so on there is a voltage difference, which is limited to Vb/4. In general, the voltage difference between adjacent lines is thus minimized, reducing the risk of current leakage described above. Those skilled in the art will appreciate that other layouts can be used instead of the example above with different number of wires.

What is claimed is:

1. A tamper resistant enclosure for protecting an electronic device comprising an intrusion detection barrier with a plurality of circuit traces for detecting mechanical intrusion attempts which cause a change in the resistance of said circuit traces, the circuit traces being connected according to a logical layout, the logical layout of the circuit traces being selected to minimize current leakage and measurable voltage differences between adjacent circuit traces, wherein the local layout is a Wheatstone bridge comprising a network of said traces connectable between two reference voltages, said traces, in use, dividing said network into a series of potential drops, each trace occupying a place in said series no further than one potential drop from an adjacent trace, the Wheatstone bridge having a number N of resistors, N being a multiple of 12.

2. The tamper resistant enclosure of claim 1 including three series of potential drops, each comprising N/3 traces, each potential drop being equal to 3/N of the difference between the reference voltages.

3. The tamper resistant enclosure of claim 1 wherein the circuitized intrusion barrier is a flexible tape.

4. An assembly comprising an electronic device having the tamper resistant enclosure of claim 1, the electronic device needing protection from unauthorized intrusion.

5. A tamper resistant enclosure for protecting an electronic device comprising an intrusion detection barrier with a plurality of circuit traces for detecting mechanical intrusion attempts which cause a change in the resistance of said circuit traces, the circuit traces being connected according to a logical layout, the logical layout of the circuit traces being selected to minimize current leakage and measurable voltage differences between adjacent circuit traces, wherein the logical layout comprises a network of said traces connectable between two reference voltages, said traces, in use, dividing said network into a series of potential drops, each trace occupying a place in said series no further than one potential drop from an adjacent trace, and further wherein the logical layout is a Wheatstone bridge comprised of a number N of resistors, N being a multiple of 12.

6. The tamper resistant enclosure of claim 5 including three series of potential drops, each comprising N/3 traces, each potential drop being equal to 3/N traces, each potential drop being equal to 3/N of the difference between the reference voltages.

* * * * *